United States Patent
Dreyer et al.

(10) Patent No.: US 10,635,341 B2
(45) Date of Patent: *Apr. 28, 2020

(54) MULTI-STREAM JOURNALED REPLAY

(71) Applicant: Western Digital Technologies, Inc., San Jose, CA (US)

(72) Inventors: David George Dreyer, Rochester, MN (US); Colin Christopher McCambridge, Rochester, MN (US); Phillip Peterson, Rochester, MN (US); Sanjay Subbarao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/953,373

(22) Filed: Apr. 13, 2018

(65) Prior Publication Data

US 2018/0232176 A1 Aug. 16, 2018

Related U.S. Application Data

(63) Continuation of application No. 15/221,547, filed on Jul. 27, 2016, now Pat. No. 9,946,489.

(51) Int. Cl.
*G06F 3/06* (2006.01)
*G06F 12/02* (2006.01)
*G06F 12/1009* (2016.01)

(52) U.S. Cl.
CPC ............ *G06F 3/0647* (2013.01); *G06F 3/064* (2013.01); *G06F 3/0619* (2013.01);
(Continued)

(58) Field of Classification Search
CPC . G06F 12/00; G06F 12/02; G06F 3/06; G06F 13/00
(Continued)

(56) References Cited

U.S. PATENT DOCUMENTS 6,229,737 B1 5/2001 Walukas
6,378,035 B1 * 4/2002 Parry ..................... G11B 20/10
375/E7.025

(Continued)

FOREIGN PATENT DOCUMENTS

JP 2009-110548 5/2009
JP 5887418 B2 3/2016
(Continued)

OTHER PUBLICATIONS

Kim et al., "Exploiting Compression-Induced Internal Fragmentation for Power-Off Recovery in SSD," IEEE, Jun. 2016, vol. 65, No. 6, 14 pages.

*Primary Examiner* — Tuan V Thai
(74) *Attorney, Agent, or Firm* — Morgan, Lewis & Bockius LLP

(57) ABSTRACT

A method of indirection replay for a flash storage system includes writing data, in a host stream, to blocksets of the flash storage system. The host blocksets are assigned a major sequence number incremented from the most recently closed host blockset. The method includes writing an indirection journal to each host blockset which are associated with the assigned major sequence number. The method includes writing data, in a garbage collection (GC) stream, to other blocksets of the flash storage system. The GC blocksets are assigned a major sequence number, based on the most recently closed host blockset, and a minor sequence number, incremented from the most recently closed GC blockset. The method includes writing an indirection journal to each GC blockset which are associated with the assigned major and minor sequence numbers. The indirection table is constructed by replaying the journals of the blocksets in order of major sequence and minor sequence numbers.

20 Claims, 3 Drawing Sheets

(52) U.S. Cl.
CPC .......... *G06F 3/0652* (2013.01); *G06F 3/0679* (2013.01); *G06F 3/0688* (2013.01); *G06F 12/0246* (2013.01); *G06F 12/1009* (2013.01); *G06F 2212/1041* (2013.01); *G06F 2212/2022* (2013.01); *G06F 2212/7201* (2013.01); *G06F 2212/7205* (2013.01)

(58) Field of Classification Search
USPC ................................ 711/100, 103, 154, 200
See application file for complete search history.

(56) References Cited

U.S. PATENT DOCUMENTS

| | | | |
|---|---|---|---|
| 6,535,920 B1 * | 3/2003 | Parry | G11B 27/28 375/E7.011 |
| 7,085,842 B2 | 8/2006 | Reid et al. | |
| 8,136,257 B2 | 3/2012 | Lau | |
| 8,200,922 B2 | 6/2012 | McKean et al. | |
| 8,290,899 B2 | 10/2012 | Webman et al. | |
| 8,949,517 B2 | 2/2015 | Cohen et al. | |
| 8,977,769 B2 | 3/2015 | Gelter | |
| 9,037,820 B2 | 5/2015 | Ratn et al. | |
| 9,588,847 B1 | 3/2017 | Natanzon et al. | |
| 9,720,618 B1 | 8/2017 | Panidis et al. | |
| 9,804,934 B1 | 10/2017 | Natanzon et al. | |
| 2002/0158878 A1 * | 10/2002 | Smirnov | G11B 20/10 345/545 |
| 2006/0155922 A1 * | 7/2006 | Gorobets | G06F 12/0246 711/103 |
| 2007/0168632 A1 | 7/2007 | Zeevi et al. | |
| 2008/0126712 A1 | 5/2008 | Mizushima | |
| 2011/0187927 A1 * | 8/2011 | Simon | H04N 21/4307 348/500 |
| 2014/0173357 A1 | 6/2014 | Anderson et al. | |
| 2014/0223231 A1 | 8/2014 | Mangold et al. | |
| 2014/0281143 A1 | 9/2014 | Shivashankaraiah | |
| 2015/0127891 A1 | 5/2015 | Yang | |
| 2015/0317079 A1 | 11/2015 | Voigt | |
| 2017/0075590 A1 | 3/2017 | Espeseth et al. | |
| 2017/0075591 A1 | 3/2017 | Espeseth et al. | |
| 2017/0161191 A1 | 6/2017 | Cohen et al. | |

FOREIGN PATENT DOCUMENTS

| | | |
|---|---|---|
| KR | 1019930008656 | 9/1993 |
| KR | 1020060051233 | 5/2006 |

* cited by examiner

MULTI-STREAM JOURNALED REPLAY

CROSS-REFERENCE TO RELATED APPLICATIONS

This application is a continuation of U.S. patent application Ser. No. 15/221,547 entitled "Multi-Stream Journaled Replay," filed on Jul. 27, 2016, now U.S. Pat. No. 9,946,489, the entirety of which is incorporated herein by reference for all purposes.

BACKGROUND

The present disclosure concerns flash storage devices and, more particularly, restoring an indirection system for flash storage devices.

An indirection system for flash storage devices keeps track of the physical location on the flash memory device for each host accessible logical block address (LBA). After the flash storage device loses power and boots again when power is restored, the indirection system is restored to the state the indirection system had before the power loss, a process known as indirection replay or replay. Indirection replay often utilizes a combination of snapshots of the indirection system as a whole, with a journal of new writes or write deltas logged alongside user data. However, snapshot-based replay may increase firmware complexity, as synchronization between snapshots and journaling must be managed. Run-time performance may suffer due to the resources required for snapshots. Boot-time performance may also suffer when replaying using a snapshot.

SUMMARY

The subject technology avoids using a snapshot for replay. The entire flash storage device is replayed from write deltas. The subject technology further allows snapshot-less replay in a multiple-stream system.

According to aspects of the subject technology, a method for replaying a flash storage device is provided. The method includes writing data, in a primary stream, to a first plurality of blocksets of a storage device. The method includes assigning a respective major sequence number to each blockset of the first plurality of blocksets, wherein the respective major sequence number is incremented from a previous major sequence number assigned to a most recently closed blockset of the first plurality of blocksets. The method further includes writing a respective indirection journal to each of the first plurality of blocksets, wherein the respective indirection journal corresponds to the data written (e.g. write deltas) to the respective blockset and is associated with the respective major sequence number assigned to the respective blockset. The method also includes writing data, in a secondary stream operating concurrently with the primary stream, to a second plurality of blocksets of the storage device. The method includes assigning respective major-minor sequence numbers to each blockset of the second plurality of blocksets, wherein the respective major-minor sequence numbers comprise the previous major sequence number assigned to the most recently closed blockset of the first plurality of blocksets and a respective minor sequence number incremented from a most recently closed blockset in the second plurality of blocksets. The method further includes writing a respective indirection journal to each of the second plurality of blocksets, wherein the respective indirection journal corresponds to the data written to the respective blockset and is associated with the respective major-minor sequence numbers assigned to the respective blockset. The method also includes constructing an indirection table in a memory of the storage device by replaying the indirection journals from the first and second pluralities of blocksets ordered first according to respective major sequence numbers and second according to respective minor sequence numbers.

According to aspects of the subject technology, a flash storage device is provided. The flash storage device includes a memory, a plurality of flash memory devices, and a controller. The flash memory devices each contain memory cells divided into blocks, and the plurality of flash memory devices are organized into blocksets by combining blocks from each flash memory device. The controller is configured to write data, in a host stream, to a first plurality of blocksets of the flash storage system. The controller is configured to assign a respective major sequence number to each blockset of the first plurality of blocksets, wherein the respective major sequence number is incremented from a previous major sequence number assigned to a most recently closed blockset of the first plurality of blocksets. The controller is further configured to write a respective indirection journal to each of the first plurality of blocksets, wherein the respective indirection journal corresponds to the data written to the respective blockset and is associated with the respective major sequence number assigned to the respective blockset. The controller is also configured to write data, in a garbage collection stream operating concurrently with the primary stream, to a second plurality of blocksets of the flash storage system. The controller is configured to assign respective major-minor sequence numbers to each blockset of the second plurality of blocksets, wherein the respective major-minor sequence numbers comprise the previous major sequence number assigned to the most recently closed blockset of the first plurality of blocksets and a respective minor sequence number incremented from a most recently closed blockset in the second plurality of blocksets. The controller is further configured to write a respective indirection journal to each of the second plurality of blocksets, wherein the respective indirection journal corresponds to the data written to the respective blockset and is associated with the respective major-minor sequence numbers assigned to the respective blockset. The controller is also configured to construct an indirection table in the memory by replaying the indirection journals from the first and second pluralities of blocksets ordered first according to respective major sequence numbers and second according to respective minor sequence numbers.

According to aspects of the subject technology, a machine-readable media encoded with executable instructions is provided. The instructions, when executed by a processor, cause the processor to perform operations. The operations include writing data, in a primary stream, to a first plurality of blocksets of a storage device. The operations include assigning a respective major sequence number to each blockset of the first plurality of blocksets, wherein the respective major sequence number is incremented from a previous major sequence number assigned to a most recently closed blockset of the first plurality of blocksets. The operations also include writing a respective indirection journal to each of the first plurality of blocksets, wherein the respective indirection journal corresponds to the data written to the respective blockset and is associated with the respective major sequence number assigned to the respective blockset. The operations further include writing data, in a secondary stream operating concurrently with the primary stream, to a second plurality of blocksets of the storage device. The operations include assigning respective major-minor sequence numbers to each blockset of the second plurality of blocksets, wherein the respective major-minor sequence numbers comprise the previous major sequence number assigned to the most recently closed blockset of the first plurality of blocksets and a respective minor sequence number incremented from a most recently closed blockset in the second plurality of blocksets. The operations also include writing a respective indirection journal to each of the second plurality of blocksets, wherein the respective indirection journal corresponds to the data written to the respective blockset and is associated with the respective major-minor sequence numbers assigned to the respective blockset. The operations include constructing an indirection table in a memory of the storage device by replaying the indirection journals from the first and second pluralities of blocksets ordered first according to respective major sequence numbers and second according to respective minor sequence numbers.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
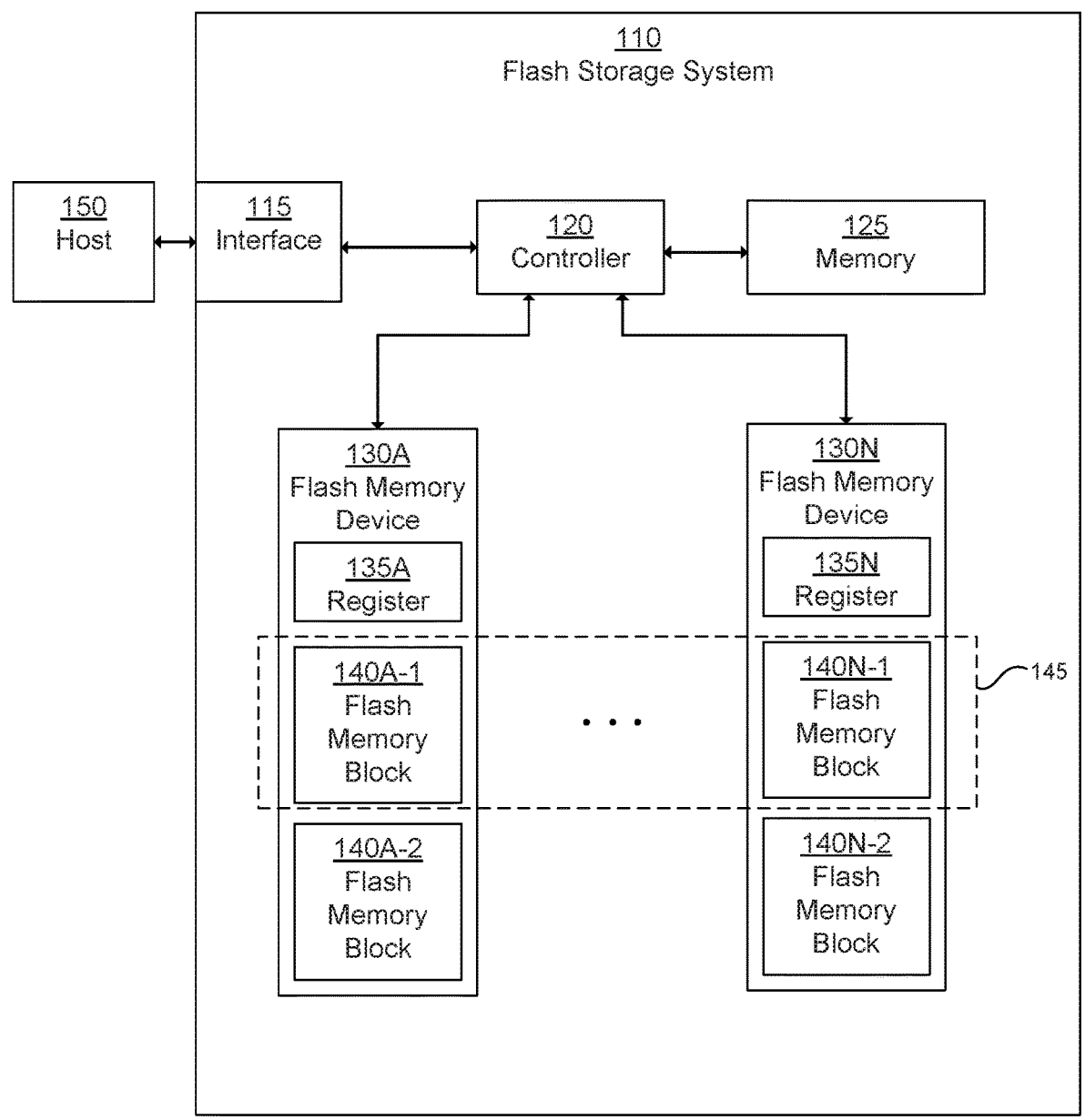
FIG. 1 is a block diagram illustrating components of a flash storage device according to aspects of the subject technology.

FIG. 1 is a block diagram illustrating components of a flash storage system 110 according to aspects of the subject technology. As depicted in FIG. 1, the flash storage system 110 includes interface 115, controller 120, memory 125, and flash memory devices 130A-130N. The interface 115 facilitates communication of data, commands, and/or control signals between flash storage system 110 and host 150. The controller 120 controls the operation of the flash storage system 110 to store and retrieve data in one of the flash memory devices 130 in accordance with commands received from the host 150. The memory 125, which may be a random access memory (RAM), provides temporary storage space for the controller 120 to process commands and transfer data between the host 150 and the flash memory devices 130A-130N. The operation of each of these components is described in more detail below.

The interface 115 provides a physical and electrical connection between the host 150 and the flash storage system 110. The interface 115 is configured to facilitate communication of data, commands, and/or control signals between the host 150 and the flash storage system 110 via the physical and electrical connection. The connection and the communications with the interface 115 may be based on a standard interface such as Universal Serial Bus (USB), Small Computer System Interface (SCSI), Serial Advanced Technology Attachment (SATA), etc. Alternatively, the connection and/or communications may be based on a proprietary interface. The subject technology is not limited to any particular type of interface.

The controller 120 manages the flow of data between the host 150 and the flash memory devices 130A-130N. The controller 120 is coupled to the interface 115 and is configured to receive commands and data from the host 150 via the interface 115. For example, the controller 120 may receive data and a write command from the host 150 to write the data in one or more flash memory devices 130. The controller 120 is further configured to send data to the host system via the interface 115. For example, the controller 120 may read data from a flash memory device 130 and send the data to the host 150 in response to a read command. The controller 120 is further configured to manage data stored in the flash memory devices 130A-130N and the memory 125 based on internal control algorithms or other types of commands that may be received from the host 150. Other maintenance operations may be performed by the controller 120 in the flash storage system 110.

The controller 120 may be implemented with a general purpose processor, micro-controller, digital signal processor (DSP), an application specific integrated circuit (ASIC), a field programmable gate array (FPGA) or other programmable logic device, discrete gate or transistor logic device, discrete hardware components, or any combination thereof designed and configured to perform the operations and functions described herein. The controller 120 may perform the operations and functions described herein by executing one or more sequences of instructions stored on a machine/computer readable medium. The machine/computer readable medium may be a flash memory device 130, the memory 125, or other types of readable media from which the controller 120 can read instructions or code. For example, the flash storage system 110 may include a read only memory (ROM), such as an EPROM or EEPROM, encoded with firmware/software comprising one or more sequences of instructions read and executed by the controller 120 during the operation of the flash storage system 110.

The flash memory devices 130A-130N may all be located on a single flash chip or arranged on multiple flash chips. The flash memory devices may be split among multiple channels through which data is read from and written to the flash memory devices by the controller 120, or coupled to a single channel. The flash memory devices 130 may be implemented using NAND flash.

A flash memory device 130 comprises multiple memory cells divided into storage blocks, such as flash memory blocks 140. These storage blocks may be referred to as data blocks or memory blocks and are addressable by the controller 120 using a physical block address. Each of the storage blocks is further divided into multiple data segments or pages addressable by the controller 120 using a physical page address or offset from a physical block address of the storage block containing the referenced page. The storage blocks represent the units of data that are erased within a flash memory device 130 in a single erase operation. The physical pages represent the units of data that are read from or written to a flash memory device 130 in a single read or write operation. The flash memory blocks 140 similarly located across the flash memory devices 130, such as the flash memory blocks 140A-1 to 140N-1, may be grouped together as a blockset 145. Each flash memory device 130 also comprises a register 135, which may be used to store, for instance, counters and other data related to the corresponding flash memory device 130.

The subject technology is not limited to any particular capacity of flash memory. For example, storage blocks in flash memory 25 may each comprise 32, 64, or 128 pages. Additionally, pages in flash memory 25 may each comprise 512 bytes, 2 kilobytes, or 4 kilobytes.

The memory 125 represents a volatile memory coupled to and used by the controller 120 during operation of the flash storage system 110. The controller 120 may buffer commands and/or data in the memory 125. The controller 120 also may use the memory 125 to store an indirection system, such as address translation tables used to convert logical data addresses used by the host 150 into virtual and/or physical addresses corresponding to portions of the flash memory devices 130A-130N. Other types of tables, data, status indicators, etc. conventionally used to manage flash storage systems also may be stored in the memory 125 by the controller 120. The memory 125 may be implemented using dynamic random access memory (DRAM), static random access memory (SRAM), or other types of volatile random access memory known to those skilled in the art without departing from the scope of the subject technology.

When the flash storage system 110 loses power, for example because of a power failure or shutting down the flash storage system 110, the state of the indirection system may be lost. Once power is restored to the flash storage system, the indirection system must be restored to the state of the indirection system before the power loss. The use of snapshots may be avoided in journal-based replay. For each write operation, a journal is logged describing changes to the mapping of virtual to physical addresses. Replaying the journal in sequential order from the first journal will rebuild the indirection system. In a single stream system, wherein only one blockset is opened and written to at a time, sequential numbering of blocksets ensures that the journals will be replayed in the correct order.

The blocksets store corresponding journals. This in-line journaling bounds the number of journals written to the storage device. In-line journal also naturally expires journals that are no longer needed, because the journals are erased when the blockset is erased. Replaying in the correct order would require replaying the journals in the order of blocksets written. However, in multiple stream systems, wherein more than one stream operate concurrently such that more than one blockset can be open at a time, a simple sequential numbering may introduce coherency errors.

For example, a host stream may open a first blockset while a garbage collection (GC) stream opens a second blockset. GC refers to the process of freeing up a block by moving valid data from the block to another block and erasing the block. It is possible that a newer version of mapping is written to a blockset in the GC stream. The correct replay sequence would depend on which blockset is closed first, so that an older mapping (based on an older journal) is not replayed after a newer mapping (based on a newer journal). However, because the sequential number is assigned as a blockset is opened, and the order of blockset closing is not predictable, the simple sequential numbering may produce errors during replay. An older mapping may end up replacing a newer mapping during replay.

Figure 2A:
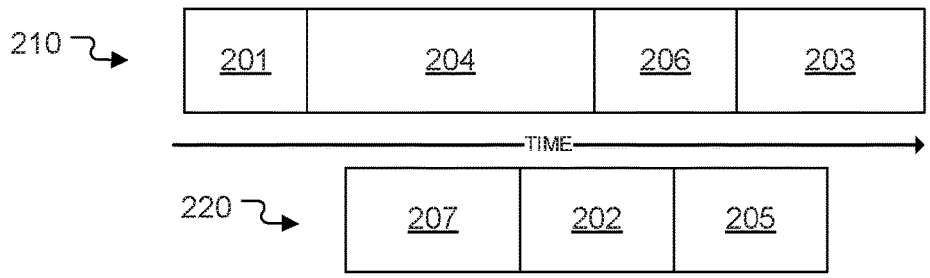
FIG. 2A is a diagram of blockset identifiers (ID) for a primary stream and a secondary stream according to aspects of the subject technology.

FIG. 2A shows sequences of blocksets being opened and closed for two streams, a primary stream 210 and a secondary stream 220. The primary stream 210 includes blocksets 201, 204, 206, and 203. The secondary stream 220 includes blocksets 207, 202, and 205. The lengths of the blocksets correspond to opening and closing times. For example, the blockset 207 is opened after the blockset 201 is closed and while blockset 204 is open. In other words, two blocksets are open for writing data at the same time. The blocksets may be closed when the blockset is no longer able to be written to, such as if there is no free space, or after a predetermined period of time, such that the blockset is not open indefinitely. The primary stream 210 may correspond to a host stream, such that blocksets 201, 204, 206, and 203 are opened and closed for host operations. The secondary stream 220 may correspond to a garbage collection (GC) stream, such that blocksets 207, 202, and 205 are opened and closed for GC operations.

According to aspects, each blockset is assigned a sequence number when the blockset is opened. The sequence number for a host blockset includes a major sequence number. The sequence number for a GC blockset includes a major-minor sequence number, which includes a major sequence number component and a minor sequence number component. The major sequence number is used to order the host blocksets. The minor sequence number is used to order the GC blocksets. When assigning sequence numbers to host blocksets, the last closed host blockset major sequence number is incremented and assigned to the current host blockset. Minor sequence numbers are not needed for the host blocksets and therefore may be 0 or NULL.

For the GC stream, the major sequence number for the GC blocksets are set to the last closed host blockset major sequence number. The minor sequence number, which may start at 1, is used to number the GC blocksets having the same major sequence number. In other words, until the last closed host blockset changes, the GC blocksets will have the same major sequence number, with different minor sequence numbers. Moreover, when selecting blocksets for the GC stream, blocksets having a major sequence number higher than the major sequence number in the current GC blockset are excluded.

Figure 2B:
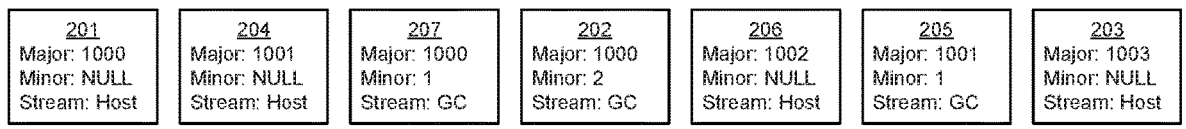
FIG. 2B shows blockset IDs with corresponding major/minor sequence numbers for the blocksets of FIG. 2A.

FIG. 2B shows ordered blockset ID blocks for the blocksets in FIG. 2A. As seen in FIG. 2A, the primary stream 210 first opens the blockset 201. The blockset 201 is assigned a major number of 1000, and a stream type of host. The minor sequence number is NULL. The blockset 201 is then closed and the blockset 204 is opened. Since the last closed blockset—the blockset 201—had the major sequence number of 1000, the blockset 204 is assigned the next major sequence number, 1001. The minor sequence number is NULL, and the stream type is host.

After the blockset 204 is opened, the blockset 207 is opened in the secondary stream 220. The last closed host blockset is the blockset 201, because the blockset 204 is still open. The blockset 201 has a major sequence number of 1000, which is also used for the major sequence number of the blockset 207. The blockset 207 is assigned a minor sequence number of 1, being the first GC blockset with the major sequence number of 1000. The stream type is set to GC.

The secondary stream 220 closes the blockset 207 and opens the blockset 202 while the blockset 204 is still open. The last closed host blockset is still the blockset 201, therefore the blockset 202 is assigned the major sequence number 1000. The minor sequence number for the blockset 202 is incremented from the previous minor sequence number and therefore set to 2. The stream type is GC.

While the blockset 202 is still open, the primary stream 210 closes the blockset 204 and opens the blockset 206. The last closed host blockset is now the blockset 204, thus the major sequence number for the blockset 206 is 1002 (e.g. incremented from the major sequence number of the blockset 204). The minor sequence number is NULL, and the stream type is host.

While the blockset 206 is still open, the secondary stream 220 closes the blockset 202 and opens the blockset 205. The last closed host blockset is the blockset 204, thus the major sequence number for the blockset 205 is 1001 (e.g. the same major sequence number of the blockset 204). The minor sequence number is set to 1, and the stream type is GC.

The primary stream 210 closes the blockset 206 and opens the blockset 203. The blockset 203 is assigned a major sequence number of 1003 (e.g. incremented from the major sequence number of the blockset 206). The minor sequence number is NULL, and the stream type is host.

Figure 3:
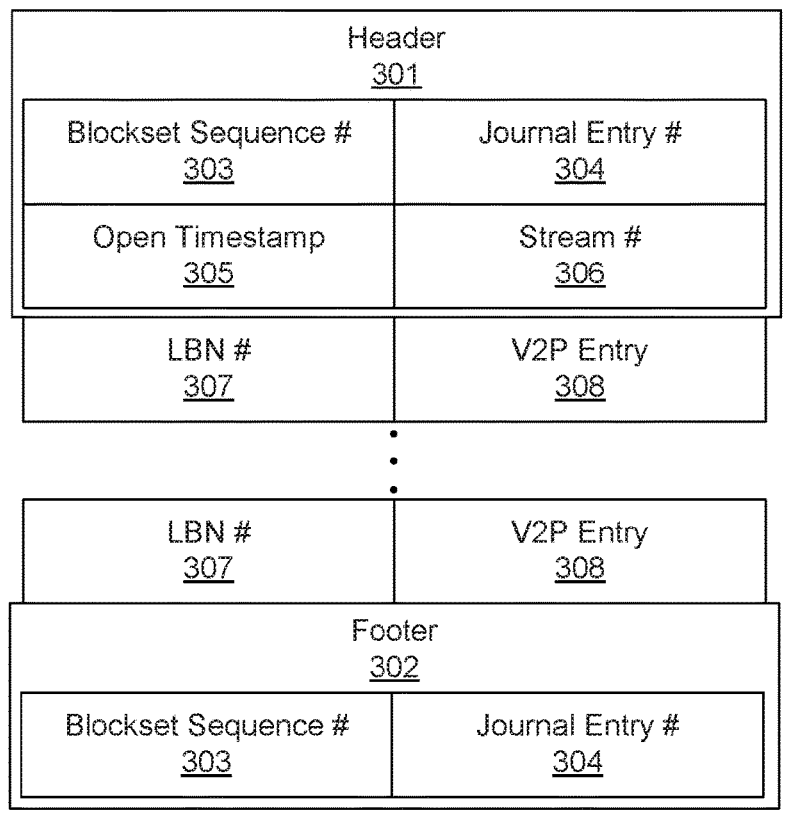
FIG. 3 is a diagram of a journal according to aspects of the subject technology.

FIG. 3 shows a diagram of a journal which may be saved to a blockset. The journal includes a header 301, a footer 302, and a series of logical block numbers (LBN) 307 pairings with virtual-to-physical (V2P) entries 308. The LBN corresponds to the logical block address and the V2P corresponds to the physical address. The LBN 307 and V2P 308 pairings describe the changes to the indirection system as a result of the corresponding write operation. The header 301 includes a blockset sequence number 303, journal entry number 304, open timestamp 305, and stream number 306. The footer 302 includes the blockset sequence number 303 and the journal entry number 304. The blockset sequence number 303 includes the major sequence number and the minor sequence number. The journal entry number corresponds to an indexing for journal entries. The open timestamp 305 corresponds to when the blockset was opened. The stream number 306 identifies the stream which opened the blockset.

Figure 4:
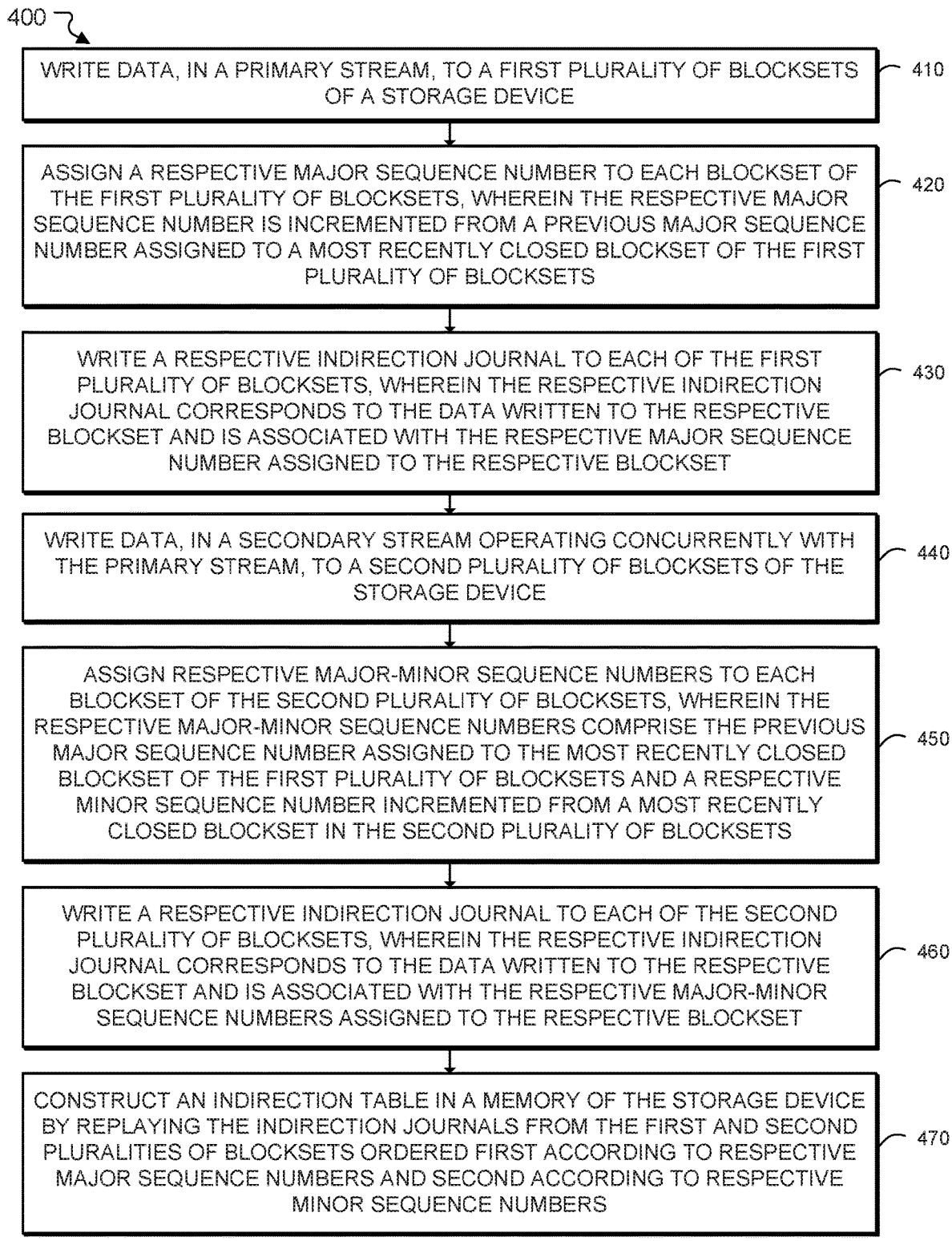
FIG. 4 is a flowchart illustrating a method for replay for a flash storage system according to aspects of the subject technology.

FIG. 4 is a flowchart illustrating a method for managing flash storage system 110 according to aspects of the subject technology. The method may be performed by controller 120 reading and executing one or more sequences of instructions from a medium encoded with the instructions. The method begins once controller 120 has completed any start-up tasks and housekeeping procedures required once flash storage device 110 has been powered up or operation interrupted for maintenance purposes and a write request has been received. The write request may be based on a command received from host 150 via interface 115. Alternatively, the write request may be generated by an internal process, such as a maintenance process, executed by controller 120. Upon receiving a write request, controller 120 initiates the write request. Initiating the write request may include determining which blocksets to write to. Once the write request has been initiated, the process starts at block 410.

At block 410, data, in a primary stream, is written to a first plurality of blocksets of a storage device. The primary stream may be a host stream, for example, for writing host data to one or more blocksets 145. The one or more blocksets 145 may be selected by the controller 120 based on blocksets needed for the write operation and factors for storage device management. The blocksets 145 may be selected and queued, or may be selected when a next blockset 145 is needed, such as after a blockset 145 is closed. The primary stream may have one blockset 145 open at a time.

At block 420, a major sequence number is assigned to each blockset of the first plurality of blocksets. The major sequence number is incremented from a previous major sequence number assigned to a most recently closed blockset of the first plurality of blocksets. When a blockset 145 is opened for the primary stream, the controller 120 determines the major sequence number of the most recently closed blockset 145. The major sequence number of the most recently closed blockset is then incremented by one to determine the current major sequence number. The current major sequence number is assigned to the currently open blockset 145. In certain implementations, the major sequence number may be tracked with a counter, which increments as a blockset is opened. In such implementations, there may be more than one primary stream opening and closing blocksets. The counter prevents a second open blockset 145 having the same major number as the first open blockset 145.

The major sequence number is assigned to a blockset when the blockset is opened in order to correctly steer write operations while the stream is open. For example, if two blocksets 145 were open but did not have major sequence numbers already assigned, the order of replay for these blocksets 145 would be undefined. In addition, certain runtime data steering decisions rely on knowing the major sequence number for each open blockset. However, in certain implementations, the major sequence number may be assigned when the blockset is closed.

At block 430, an indirection journal is written to each of the first plurality of blocksets. The indirection journal corresponds to the data written to the blockset and is associated with the major sequence number assigned to the respective blockset. The indirection journal is written to each blockset 145 as the blockset 145 is updated. One or more indirection journals may be written to a block 140 of the blockset 145. A directory may be written to, for example, the last block 140 of the blockset 145, which keeps track of the indirection journals. Thus, the indirection journals may be scattered across the blockset 145. In addition, the indirection journals may be written to specific locations, such as a page after the last page of the logical stripe.

At block 440, data, in a secondary stream operating concurrently with the primary stream, is written to a second plurality of blocksets. The secondary stream may be a garbage collection stream or other maintenance stream. The blocksets may be selected and queued, or may be selected as the previous blockset is closed. For example, the GC stream may select a blockset 145 for a GC operation. However, the GC stream will exclude blocksets having major sequence numbers greater than the current GC major sequence number.

At block 450, major-minor sequence numbers are assigned to each blockset of the second plurality of blocksets. The major-minor sequence numbers comprise the previous major sequence number assigned to the most recently closed blockset of the first plurality of blocksets and a minor sequence number incremented from a most recently closed blockset in the second plurality of blocksets. In certain implementations, such as systems with multiple host streams, the oldest host major sequence number across all host streams is used for the GC major sequence number.

At block 460, an indirection journal is written to each of the second plurality of blocksets. The indirection journal corresponds to the data written to the respective blockset and is associated with the respective major-minor sequence numbers assigned to the respective blockset. The journal is written to the corresponding blockset 145 as the blockset 145 is updated, similar to block 430 described above.

At block 470, an indirection table is constructed in a memory of the storage device by replaying the indirection journals from the first and second pluralities of blocksets ordered first according to respective major sequence numbers and second according to respective minor sequence numbers. Block 470 may occur during a boot sequence for the flash storage system 110. For example, the flash storage system 110 may have lost power or may have been shut down and subsequently powered on again.

The blocksets 145 of the flash storage system 110 having journals are identified. The controller 120 may identify which of the blocksets 145 have valid data, and determine the major or major-minor sequence numbers of the blocksets 145 having valid data. In certain implementations, the controller 120 may maintain a persistent list of blocksets 145 and the corresponding major or major-minor sequence numbers. In certain other implementations, each blockset 145 may maintain an identifier or link to the next blockset 145 in the associated stream, for example by storing, when a blockset is closed, an identifier to the next blockset being opened in the stream.

The blocksets 145 having journals are ordered according to respective major sequence numbers first. Blocksets 145 having the same major sequence number are then ordered by minor sequence number, with 0 or NULL being first. Replay occurs by replaying the journals from the blocksets 145 in this order of blocksets.

Alternatively, the blocksets 145 having journals may be separated into two lists, a host list and a GC list. The host list includes blocksets 145 designated as host type, and the GC list includes blocksets 145 designated as GC type. The blocksets of the host list are sorted by major sequence number. The blocksets of the GC list are sorted first by major sequence number, and then by minor sequence number.

Replay starts with the oldest sequence number, which may be from either the host list or the GC list. When replaying host blocksets, the journals of the blocksets are replayed until a host blockset is replayed having a major sequence number matching a major sequence number of a GC blockset at the head of the GC list (e.g. the oldest GC blockset that has not been replayed). After this host blockset is replayed, the GC blocksets are replayed, starting with the head of the GC list.

The current GC major sequence number corresponds to the head of the GC list. The GC blocksets are replayed until all GC blocksets having the same major sequence number as the current GC major sequence number are replayed. Then, the next host blocklist is replayed. Replay switches between the host list and the GC list until all blocksets have been replayed.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
opening, in a storage device, a first stream comprising a first plurality of blocksets for storage of information in the first plurality of blocksets;
opening, in the storage device concurrently with the first stream, a second stream comprising a second plurality of blocksets for storage of information in the second plurality of blocksets;
writing respective first sequence information to each of the first plurality of blocksets, wherein each written first sequence information includes a first sequence number incremented from a previous first sequence number written to a most recently closed blockset of the first plurality of blocksets;
writing respective second sequence information to each of the second plurality of blocksets, each written second sequence information comprising a previous first sequence number written to the most recently closed blockset of the first plurality of blocksets and a second sequence number incremented from a previous second sequence number written to a most recently closed blockset of the second plurality of blocksets; and
constructing an indirection table in a memory of the storage device by reading journal information from the first and second pluralities of blocksets, ordered first according to respective first sequence numbers and second according to respective second sequence numbers.

2. The method of claim 1, further comprising:
writing, to each of the first plurality of blocksets, journal information describing changes to a mapping of respective first virtual to physical addresses, the journal information corresponding to data written to the blockset of the first plurality of blocksets and being associated with the first sequence number written to the blockset of the first plurality of blocksets;
writing, to each of the second plurality of blocksets, journal information describing changes to a mapping of respective second virtual to physical addresses, the journal information corresponding to data written to the blockset of the second plurality of blocksets and being associated with the first and second sequence numbers written to the blockset of the second plurality of blocksets.

3. The method of claim 2, further comprising:
writing, for each of the first and second plurality of blocksets, the journal information as the blockset is updated with the data written to the blockset.

4. The method of claim 1, wherein constructing the indirection table comprises:
ordering the first plurality of blocksets according to respective first sequence numbers;
ordering the second plurality of blocksets according to respective first sequence numbers; and
ordering blocksets of the second plurality of blocksets having a same first sequence number according to respective second sequence numbers.

5. The method of claim 1, wherein constructing the indirection table comprises:
identifying, in the storage device, the first plurality of blocksets and the second plurality of blocksets based on identifying journal information within the respective blocksets;
organizing the first plurality of blocksets into a first list sorted by first sequence numbers;
organizing the second plurality of blocksets into a second list, first sorted by first sequence numbers and then by second sequence numbers;
replaying journal information from the organized first and second pluralities of blocksets based on identifying and replaying blocksets from the first list until a first sequence number of a currently identified blockset of the first list matches a first sequence number of a blockset at a beginning of the second list, and then identifying and replaying blocksets from the second list having the same sequence number as the currently identified blockset of the first list, and then identifying and replaying a next blockset from the first list.

6. The method of claim 5, wherein constructing the indirection table comprises:
wherein identifying the first and second pluralities of blocksets comprises identifying, before organizing the first and second plurality of blocksets into respective first and second lists, that the first and second plurality of blocksets as having valid data.

7. The method of claim 1, wherein opening the first and second streams comprises opening a block of the second plurality of blocksets after a first blockset of the first plurality of blocksets is closed and while a second blockset of the first plurality of blocksets is open, and
wherein a respective blockset of the first or second plurality of blocksets is closed when the respective blockset is no able to be written to.

8. The method of claim 1, wherein the first stream is utilized in connection with write operations initiated by a host device, and the second stream is utilized in connection with garbage collection operations performed by the storage device.

9. The method of claim 1, wherein the opening of the first and second stream occurs prior to a loss of power in the storage device, and wherein the indirection table is constructed following the power being restored.

10. A storage system, comprising:
a non-transitory volatile memory medium;
a non-transitory non-volatile memory medium; and
a controller configured to:
open a first stream comprising a first plurality of blocksets for storage of information in the first plurality of blocksets on the non-volatile memory;
open, concurrently with the first stream, a second stream comprising a second plurality of blocksets for storage of information in the second plurality of blocksets on the non-volatile memory;
write respective first sequence information to each of the first plurality of blocksets, wherein each written first sequence information includes a first sequence number incremented from a previous first sequence number written to a most recently closed blockset of the first plurality of blocksets;
write respective second sequence information to each of the second plurality of blocksets, each written second sequence information comprising a previous first sequence number written to the most recently closed blockset of the first plurality of blocksets and a second sequence number incremented from a previous second sequence number written to a most recently closed blockset of the second plurality of blocksets; and
construct an indirection table in the volatile memory medium by reading journal information from the first and second pluralities of blocksets, ordered first according to respective first sequence numbers and second according to respective second sequence numbers.

11. The storage system of claim 10, wherein the controller is further configured to:
   write, to each of the first plurality of blocksets, journal information describing changes to a mapping of respective first virtual to physical addresses, the journal information corresponding to data written to the blockset of the first plurality of blocksets and being associated with the first sequence number written to the blockset of the first plurality of blocksets;
   write, to each of the second plurality of blocksets, journal information describing changes to a mapping of respective second virtual to physical addresses, the journal information corresponding to data written to the blockset of the second plurality of blocksets and being associated with the first and second sequence numbers written to the blockset of the second plurality of blocksets.

12. The storage system of claim 11, wherein the controller is further configured to:
   write, for each of the first and second plurality of blocksets, the journal information as the blockset is updated with the data written to the blockset.

13. The storage system of claim 10, wherein the controller being configured to construct the indirection table comprises the controller being configured to:
   order the first plurality of blocksets according to respective first sequence numbers;
   order the second plurality of blocksets according to respective first sequence numbers; and
   order blocksets of the second plurality of blocksets having a same first sequence number according to respective second sequence numbers.

14. The storage system of claim 10, wherein the controller being configured to construct the indirection table comprises the controller being configured to:
   identify, from the non-volatile memory medium, the first plurality of blocksets and the second plurality of blocksets based on identifying journal information within the respective blocksets;
   organize the first plurality of blocksets into a first list sorted by first sequence numbers;
   organize the second plurality of blocksets into a second list, first sorted by first sequence numbers and then by second sequence numbers;
   replay journal information from the organized first and second pluralities of blocksets based on identifying and replaying blocksets from the first list until a first sequence number of a currently identified blockset of the first list matches a first sequence number of a blockset at a beginning of the second list, and then identify and replay blocksets from the second list having the same sequence number as the currently identified blockset of the first list, and then identify and replay a next blockset from the first list.

15. The storage system of claim 10, wherein the controller being configured to open the first and second streams comprises the controller being configured to open a block of the second plurality of blocksets after a first blockset of the first plurality of blocksets is closed and while a second blockset of the first plurality of blocksets is open, and wherein the controller is further configured to close a respective blockset of the first or second plurality of blocksets when the respective blockset is no able to be written to.

16. The storage system of claim 10, wherein the controller is configured to utilize the first stream in connection with write operations initiated by a host device, and utilize the second stream in connection with garbage collection operation, and wherein the controller is configured to open of the first and second stream prior to a loss of power in the system, and to construct the indirection table following the power being restored.

17. A machine-readable non-transitory media encoded with executable instructions which, when executed by a processor, cause the processor to perform operations comprising:
   opening, in a storage device, a first stream comprising a first plurality of blocksets for storage of information in the first plurality of blocksets;
   opening, in the storage device concurrently with the first stream, a second stream comprising a second plurality of blocksets for storage of information in the second plurality of blocksets;
   writing respective first sequence information to each of the first plurality of blocksets, wherein each written first sequence information includes a first sequence number incremented from a previous first sequence number written to a most recently closed blockset of the first plurality of blocksets;
   writing respective second sequence information to each of the second plurality of blocksets, each written second sequence information comprising a previous first sequence number written to the most recently closed blockset of the first plurality of blocksets and a second sequence number incremented from a previous second sequence number written to a most recently closed blockset of the second plurality of blocksets; and
   constructing an indirection table in a memory of the storage device by reading journal information from the first and second pluralities of blocksets, ordered first according to respective first sequence numbers and second according to respective second sequence numbers.

18. The machine-readable non-transitory media of claim 17, wherein the operations further comprise:
   writing, to each of the first plurality of blocksets, journal information describing changes to a mapping of respective first virtual to physical addresses, the journal information corresponding to data written to the blockset of the first plurality of blocksets and being associated with the first sequence number written to the blockset of the first plurality of blocksets;
   writing, to each of the second plurality of blocksets, journal information describing changes to a mapping of respective second virtual to physical addresses, the journal information corresponding to data written to the blockset of the second plurality of blocksets and being associated with the first and second sequence numbers written to the blockset of the second plurality of blocksets.

19. The machine-readable non-transitory media of claim 17, wherein the operations further comprise:
   identifying, in the storage device, the first plurality of blocksets and the second plurality of blocksets based on identifying journal information within the respective blocksets;

organizing the first plurality of blocksets into a first list sorted by first sequence numbers;

organizing the second plurality of blocksets into a second list, first sorted by first sequence numbers and then by second sequence numbers;

replaying journal information from the organized first and second pluralities of blocksets based on identifying and replaying blocksets from the first list until a first sequence number of a currently identified blockset of the first list matches a first sequence number of a blockset at a beginning of the second list, and then identifying and replaying blocksets from the second list having the same sequence number as the currently identified blockset of the first list, and then identifying and replaying a next blockset from the first list.

20. The machine-readable non-transitory media of claim 17, wherein opening the first and second streams comprises opening a block of the second plurality of blocksets after a first blockset of the first plurality of blocksets is closed and while a second blockset of the first plurality of blocksets is open, and wherein a respective blockset of the first or second plurality of blocksets is closed when the respective blockset is no able to be written to.

* * * * *